United States Patent [19]

Salem

[11] Patent Number: 4,488,824

[45] Date of Patent: Dec. 18, 1984

[54] METHOD AND APPARATUS FOR PRECISION TEMPERATURE MEASUREMENT

[75] Inventor: Robert J. Salem, Danbury, Conn.

[73] Assignee: MIT Trading Corporation, Stamford, Conn.

[21] Appl. No.: 378,418

[22] Filed: May 14, 1982

[51] Int. Cl.[3] ............................................. G01K 7/12
[52] U.S. Cl. ..................................... 374/181; 374/178
[58] Field of Search ...................... 374/181, 182, 180; 364/255

[56] References Cited

U.S. PATENT DOCUMENTS

| | | | |
|---|---|---|---|
| 3,280,630 | 10/1966 | Latham, Jr. | 374/181 |
| 3,461,380 | 8/1969 | McGee | 374/181 |
| 3,903,743 | 9/1975 | Noller | 374/181 |
| 3,921,453 | 11/1975 | Platzer, Jr. | 374/181 |
| 4,120,201 | 10/1978 | Wango | 374/181 |
| 4,126,042 | 11/1978 | Lynch | 374/181 |
| 4,133,700 | 1/1979 | Hollander et al. | 374/181 |
| 4,157,663 | 4/1979 | Ihlenfeldt et al. | 374/181 |

FOREIGN PATENT DOCUMENTS

| | | | |
|---|---|---|---|
| 41570 | 3/1977 | Japan | 374/181 |
| 2074734 | 11/1981 | United Kingdom | 374/181 |

*Primary Examiner*—Gerald Goldberg
*Assistant Examiner*—Hezron Williams
*Attorney, Agent, or Firm*—Hopgood, Calimafde, Kalil, Blaustein & Judlowe

[57] ABSTRACT

A bandgap voltage reference and temperature sensor is used to determine accurately the temperature of the cold junction of a thermocouple for algebraic combination with the thermocouple signal to provide precision temperature measurements with thermocouple speed. In a discrete component embodiment copper slugs function as thermal inertial elements to equalize the thermal response rates of the temperature sensor and thermocouple. In an IC embodiment the cold junction is located on the chip in close proximity to the temperature sensor component in the chip thereby avoiding any thermal differential between cold junction and sensor.

2 Claims, 6 Drawing Figures

U.S. Patent   Dec. 18, 1984   Sheet 3 of 3   4,488,824
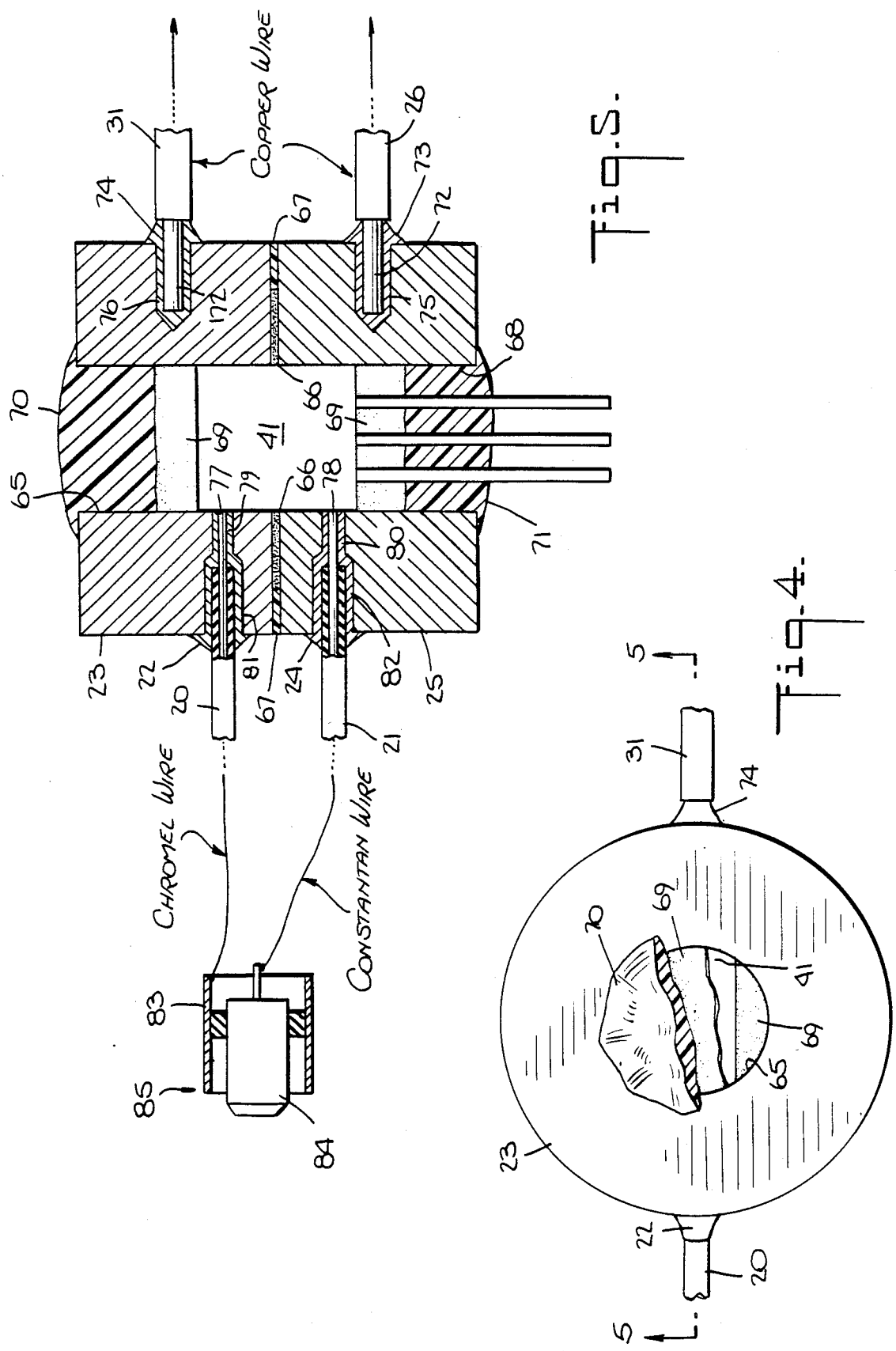

METHOD AND APPARATUS FOR PRECISION TEMPERATURE MEASUREMENT

BACKGROUND OF THE INVENTION

The present invention relates to temperature measuring devices and, more particularly, to precision thermocouple type thermometers where fast reading, low cost and clinical accuracy is desired.

While the subject invention has broad application its advantages can best be appreciated by considering its application to clinical measurements. Clinical electronic thermometers are presently known and usually employ either thermistors or semiconductor thermal sensors. Although these components along with their peripheral electronics are relatively inexpensive, both types of sensors have disadvantages which limit their use for rapid measurement with high accuracy over a wide temperature range. The performance of both the thermistor and semiconductor thermal sensor is limited to relatively slow direct or indirect measurements, these components having thermal rise times as long as 30 to 60 seconds as a consequence of their significant mass and nonhomogeneous construction. The voltage response with temperature of a thermistor is linear over only a very narrow range. Therefore, accuracy of thermistor thermometers for clinical use has been limited to narrow ranges, typically 96° F. to 109° F. If it is desired to expand the range of such devices, it becomes necessary to provide range switching with each range separately calibrated because the rate of response in different temperature ranges varies markedly. To avoid this problem it is necessary to use external resistor networks to linearize the action of the thermistor. Thus, it is difficult to use this type of construction with integrated circuits.

Both thermistor and semiconductor thermal sensors when used for clinical measurements are not amenable to use in the form of expendable probes both because of their relative expense and the significant differences in response from probe to probe. If the probe were to be changed from patient to patient, the devices would have to be recalibrated each time. The known thermometers of this type, therefore, use permanent probes with disposable envelopes or covers for the probes which covers increase the thermal mass and measurement time even more.

It is well known that thermocouples generate voltage as a function of the metals or alloys incorporated therein, are consistent from thermocouple to thermocouple and are readily interchangeable. Sensitive thermocouples can be produced inexpensively and have very fast thermal response times, usually less than 1 millisecond. Nevertheless, the use of thermocouples in thermometers, particularly clinical thermometers, has been limited as a consequence of costly peripheral electronics and the need for a precise cold junction compensator. For example, one method which has been used is to maintain the cold junction at a fixed known temperature by placing the cold junction within an ice bath so that the temperature is known to be 32° F. However, this method is too cumbersome for practical use. In the alternative, expensive and complicated measuring or temperature stabilizing devices must be used where any finer degree of accuracy is required.

SUMMARY OF THE INVENTION

It is an object of the present invention to provide a very fast inexpensive temperature measuring device employing a thermocouple as the temperature sensor. It is also an object of the present invention to provide a thermocouple type sensing device which can be used with integrated circuits. It is a further object to provide an accurate clinical thermometer capable of reading temperatures with an accuracy of ±0.2° F., capable of operating over a relatively broad range of temperatures and also adaptable for interchangeable, disposable probes requiring no calibration from probe to probe.

In accordance with one aspect of the invention there is provided a temperature measuring device for providing a signal representative of a temperature to be measured, comprising in combination a thermocouple for sensing the temperature to be measured, said thermocouple having a hot and a cold junction for providing a first signal as a function of the temperature difference between said hot and cold junctions, means responsive to temperature arranged in a common structure with said cold junction to provide a second signal as a function of the actual temperature of said cold junction, and means coupled responsively to said first mentioned means and thermocouple for providing a third signal representative of the algebraic addition of said first and second signals, said third signal being representative of said temperature to be measured.

In accordance with another aspect of the invention there is provided a method for providing precision temperature measurements which comprises the steps of sensing the temperature to be measured with the hot junction of a thermocouple, determining the temperature of the cold junction of the thermocouple with a temperature sensor, equalizing the thermal response rates of said thermocouple cold junction and said temperature sensor, and combining the measurements from said thermocouple and said sensor to provide an indication of the temperature sensed by said hot junction.

BRIEF DESCRIPTION OF THE DRAWINGS

The invention will be better understood after reading the following detailed description of the presently preferred embodiments thereof with reference to the appended drawings in which:

FIG. 4 is a top plan view of the cold junction compensator employed in the circuit of FIG. 3;

FIG. 5 is a vertical sectional view taken along the line 5—5 in FIG. 4, and also shows a probe mount connected thereto.

The same reference numerals are used throughout the drawings to designate the same or similar parts.

DETAILED DESCRIPTION OF THE PREFERRED EMBODIMENTS

Figure 1:
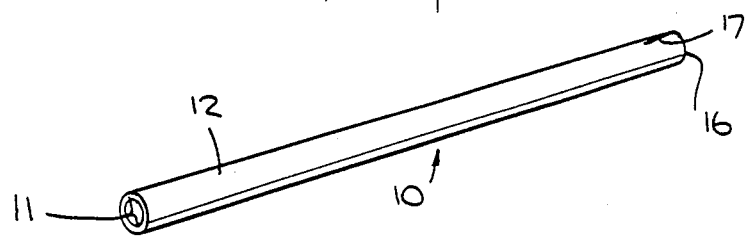
FIG. 1 is a perspective view of a thermocouple probe embodied in a "straw" for clinical temperature measurement.
Figure 2:
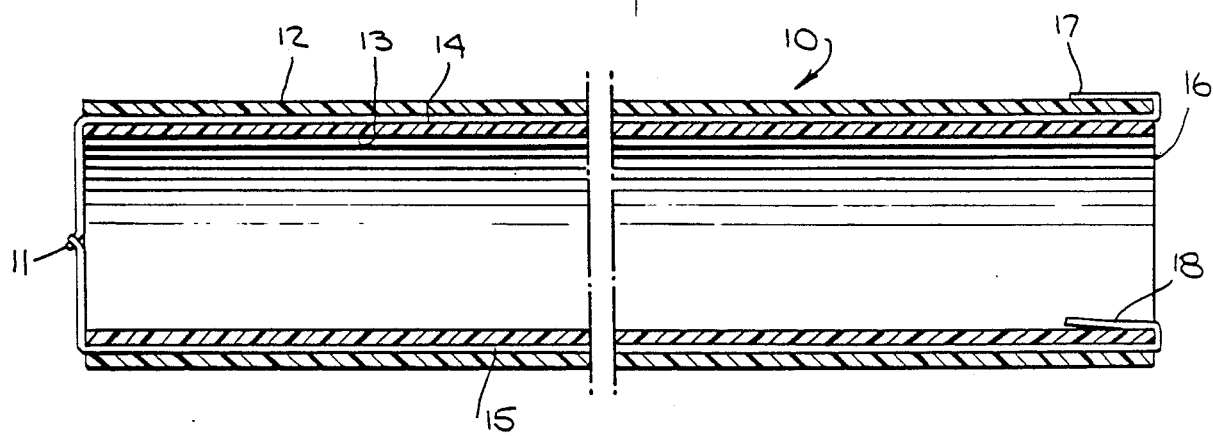
FIG. 2 is an enlarged longitudinal sectional view of the probe of FIG. 1 showing the construction thereof.

Referring to FIGS. 1 and 2 there is shown a disposable thermocouple probe designated generally by the reference numeral 10 resembling a straw and having a thermocouple hot junction 11 exposed at one end thereof. As best seen in FIG. 2, the probe consists of two concentric snug fitting plastic tubes 12 and 13 with the wires 14 and 15 from the thermocouple junction 11 disposed in the interface therebetween, one on each diametral side of the tubular structure. For example, one of the wires such as the wire 14 may be of chromel while the other wire, 15, may be of constantan. The wires may be of the order of 3 mils in diameter and exit from the structure 10 at the opposite end, 16, with the wire 14 being bent radially outwardly and folded back over the outside of the structure 10 at 17. The wire 15 also exits at the end 16 and is folded inwardly against the inner surface of the structure 10 at 18. Connection to the thermocouple can be effected by inserting the end 16 of the probe 10 between the inner and outer contacts of a concentric connector, the details of which will be described after a consideration of the electronic measuring circuit.

Figure 3:
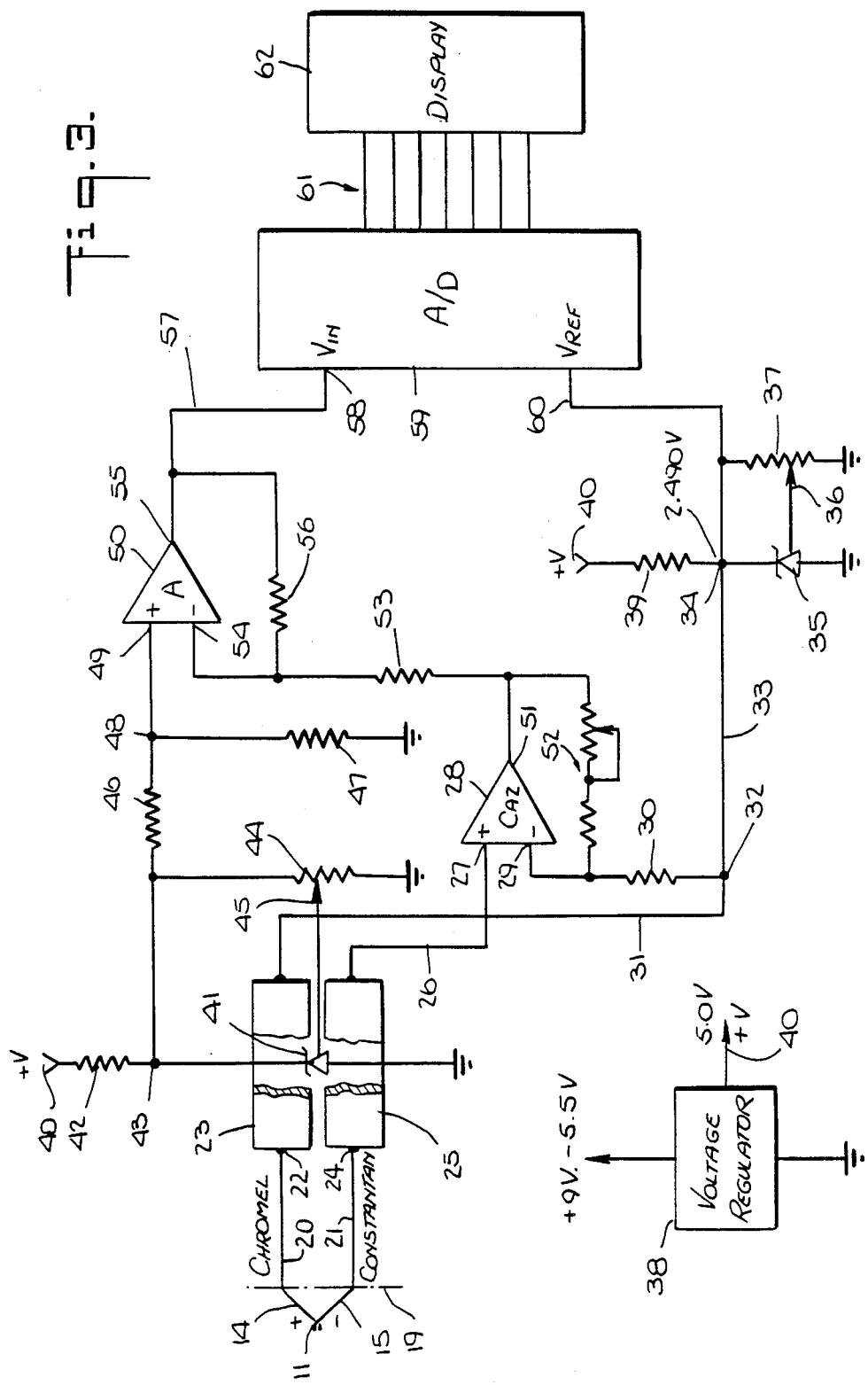
FIG. 3 is a schematic circuit diagram of a discrete circuit embodiment of a precision thermometer in accordance with the present invention.

FIG. 3 shows the thermocouple hot junction 11 and its interconnecting leads 14 and 15 joined at the broken line 19 by a connector (not shown) to respective chromel and constantan extension leads 20 and 21. The chromel extension lead 20 is connected by a solder joint at 22 to a body or slug of copper 23. Similarly, the constantan extension lead 21 is connected at a soldered junction 24 to a body or slug of copper 25. The remaining wiring throughout the embodiment now being described is preferably of copper to avoid the introduction of unwanted contact potential. Thus, a copper lead 26 interconnects the copper body 25 with the direct or positive input 27 of a chopper stabilized operational amplifier 28, sometimes referred to as a commutating auto zero amplifier and here designated by the acronym CAZ. The indirect input 29 of the CAZ amplifier 28 is connected through a resistor 30 and a copper lead 31 to the copper body 23. The junction between resistor 30 and lead 31 at 32 is connected over a lead 33 to the output junction 34 of a voltage reference bandgap device 35 which is an extremely stable voltage reference source. The adjust input to the bandgap device 35 is connected to the adjustable contact 36 of the potentiometer 37 which, in turn, is connected between output junction 34 and ground. Voltage to the junction 34 is supplied from a voltage regulator 38 powered from a 9 volt battery and supplied through a load resistor 39 from a voltage output point 40.

The connection points 22 and 24 between the chromel and constantan wires on the one hand and the copper bodies 23 and 25 on the other hand extend into the copper bodies and constitute the cold junction for the thermocouple. This will be described in greater detail below. In order to measure the temperature of the cold junction there is provided another bandgap device 41 intimately associated with the bodies 23 and 25 within a central cavity. As shown, the bandgap temperature sensor 41 is connected from ground through a load resistor 42 to the output 40 of the voltage regulator 38. The junction 43 between the resistor 42 and device 41 is connected through the resistive element 44 of a potentiometer to ground. The adjustable contact 45 on the potentiometer 44 is connected to the adjust input for the bandgap device 41. The junction 43 is also connected through a resistor 46 in series with a resistor 47 to ground. The junction 48 between the resistors 46 and 47 is connected to the direct input 49 of an operational amplifier 50.

The CAZ amplifier 28 has an output 51 connected through an adjustable feedback resistor network 52 to its indirect input 29. The output 51 is also connected through a resistor 53 to the indirect input 54 of the amplifier 50. The amplifier 50, in turn, has an output 55 connected through a resistor 56 back to its own indirect input 54. Adjustable resistor network 52 is used to adjust the gain of CAZ amplifier 28.

The output 55 from amplifier 50 is also connected over a lead 57 to the variable input 58 of an analog-to-digital converter 59. The converter 59 is provided with a reference voltage at its input terminal 60 from the regulated output voltage point 34. In addition, the analog-to-digital converter 59 has an output array 61 connected to a display device 62.

A satisfactory embodiment of FIG. 3 can be constructed in which the CAZ amplifier 28 is an Intersil type ICL 7650 chopper stablized operational amplifier while the amplifier 50 is a National Semiconductor Corporation type LM 358. Bandgap voltage regulator 35 may be a National Semiconductor Corporation type LM 336 that can be adjusted to provide a closely controlled output voltage of 2.490 volts; i.e., twice the 1.245 volt energy bandgap of its silicon semiconductor components. The particular bandgap device used for the temperature sensor 41 can be a type LM 335 precision temperature sensor, also produced by National Semiconductor Corporation. The bandgap devices 35 and 41 will operate efficiently so long as they are provided with a reasonably stable supply voltage. In addition, one may use as the analog-to-digital converter 59, a National Semiconductor Corporation type NSB 3701 which requires a relatively stable voltage of between 4.6 and 5.8 volts. Therefore, the voltage regulator 38 preferably should be designed to provide an output voltage at 40 that is maintained within the range of 4.6 to 5.8 volts for an input range of 5.5 to 9 volts.

Thermocouples produce an output voltage at a very low voltage-to-degree response rate that is a function of the difference in temperature between their hot and cold junctions. However, semiconductor devices, in particular the subject bandgap devices, generally operate at much higher voltage-to-degree response rates and provide output signals that vary as a function of temperature above absolute zero. In effect, therefore, thermocouple and bandgap devices produce signals related to different temperature reference points and at different voltage-to-degree response rates. Since the thermocouple only provides an indication of the difference in temperature between its hot and cold junctions it is necessary to know the temperature of the cold junction very accurately in order to determine the temperature of the hot junction. If a signal can be provided that represents the temperature of the cold junction and if such signal changes with temperature at the same rate of change as the signal produced by the thermocouple, it is possible to add the two signals and produce a third signal representative of the temperature to be measured. However, if the signals from the cold junction sensor and from the thermocouple change with temperature at different rates as observed above, it is necessary to modify at least one of the signals to have them both changing, with temperature, at the same rate.

Assuming one wishes to indicate temperature based on a selected scale, it would be desirable to have a selected stable voltage level representing a given temperature reference point. For this, the stable voltage produced by bandgap device 35 can be used. Therefore, if its output voltage is adjusted to 2.490 V. and indications are desired in Fahrenheit degrees, for example, that voltage level can correspond to 0° F. On the absolute scale this means that the 2.490 volt level corresponds to 459 Fahrenheit degrees above absolute zero and represents 5.4248 mV./° F. However, the response of the thermocouple based upon a chromel/constantan couple is approximately 34.3 $\mu$V./° F. Thus, for system compatability, it will be necessary to modify or scale up the output voltage of the thermocouple response to the same voltage-to-degree relationship, that is, to 5.4248 mV/° F.

In operation, as shown in FIG. 3, a first voltage or signal is generated by the thermocouple which is directly proportional to the difference in temperature between the thermocouple hot junction 11 and the thermocouple cold junction 22 and 24. In this case, using a constantan/chromel thermocouple, the voltage generated equals 34.3 $\mu$V./° F. For example, if the temperature at the hot junction 11 is 98.6° F. and if the temperature at the cold junction is 70° F., the voltage generated will be 980.98 $\mu$V=0.00098098 V. A second voltage generated by bandgap device 41 at terminal 43 is directly proportional to the absolute temperature of the thermocouple cold junction. This temperature may also be referred to as the ambient temperature, and in this case the voltage generated by sensor 41 equals 5.4248 mV. per Fahrenheit degree above absolute zero. For an ambient temperature of 70° F., the voltage generated between terminal 43 and ground would be 2.8697 volts, i.e., $(459° + 70°)5.4248 \times 10^{-3}$. The voltage divider network consisting of resistors 46 and 47 along with potentiometer 44 provides a voltage at junction 48 that is one half of that appearing at terminal 43. This is to compensate for the difference in gain of amplifier 50 for signals furnished to its direct input 49 and indirect input 54.

The thermocouple voltage is fed between the direct input to CAZ amplifier 28 and terminal 32. However, terminal 32 is maintained at a fixed offset reference voltage by bandgap device 35. In the example shown, the reference voltage is adjusted by adjustable arm 36 of potentiometer 37 so that it is maintained very accurately at 2.490 volts. As previously stated, this voltage establishes the level for 0° F. based on a voltage-to-temperature scale of 5.4248 mV./° F. from absolute zero.

In order to scale up the thermocouple voltage so that its rate of voltage change per ° F. matches that of the bandgap device 41, it is necessary for the CAZ amplifier to have a gain of 5.4248 mV. divided by 34.3 $\mu$V., i.e., a gain of 158.157. This gain is adjusted and settable by the resistance network 52. With the CAZ amplifier 28 connected as shown its output voltage at output 51 will be equal to the offset or reference voltage at 32 minus the CAZ amplifier gain multiplied by the thermocouple voltage. For the selected example the voltage at 51 will be [2.490−158.157(0.00098098)]=2.33485 V.

The amplified or scaled up thermocouple voltage combined with the offset voltage is then fed through resistor 53 to the indirect input 54 of operational amplifier 50. Amplifier 50 is connected to provide an output signal corresponding to the algebraic addition of the voltage signals appearing at 49 and 54. The output 55 of amplifier 50 for unity gain would then be a voltage which is proportional to the temperature being measured at the thermocouple hot junction in ° F. which voltage would vary at the rate of 5.4248 mV./° F., the signal from terminal 43 corresponding to the absolute scale having been corrected to Fahrenheit by subtracting the offset voltage, i.e., 2.490 V.=459°. The output voltage at 55 in this form could be used for any desired purpose as a signal representative of the hot junction temperature.

If is is desired to display the temperature in digital form, for example, the signal at terminal 55 is fed into the input 58 of an analog-to-digital converter 59. The reference voltage, which corresponds to 0° F. (here 2.490 volts), is fed into terminal 60 of the analog-to-digital converter 59. Since the voltage at 58 corresponds to the temperature at the hot junction, the display 62, in conventional manner, can be made to read the precise digital temperature at the hot junction. This display will respond extremely fast and will be very accurate. With the equipment shown, temperatures can be read within 3 seconds and will be accurate to ±0.2° F. over a range of 80° F. to 140° F. In addition, the device shown in FIG. 3 is very compact, lightweight and easy to carry. It has the added advantage of being usable over a wide range of temperatures and is relatively simple and inexpensive.

As previously mentioned, it is preferred at present to use an NSB 3701 analog-to-digital converter. This device has a count capacity of 4000 and if it is desired to display temperature readings to the nearest tenth it provides a capacity of zero to 400 degrees, providing an output display of 400.0 when the voltage at its input terminal 58 equals the voltage at its reference terminal 60, i.e., 2.490 V. But 2.490 V. has been equated in the system to a range of 459° rather than 400°. To compensate for this it is necessary to increase the gain of operational amplifier 50 from unity to the ratio of 459 to 400 or to 1.1475.

For the selected example of a hot junction temperature of 98.6° F. and a cold junction temperature of 70° F. the voltage at point 43 will be equal to 5.4248 mV. (70°+459°)=2.86972 V. The voltage at terminal 51 was previously noted as being 2.33485 V. Therefore, the voltage at terminal 55 will be (2.86972−2.33485)1.1475=0.6137633 V. Applying this signal through input 58 to the A/D device 59 yields an output equal to 0.6137633 divided by 2.490 multiplied by 400 which equals 98.597° F., i.e., 98.6° F., the desired temperature reading.

Throughout the above discussion it has been assumed that the temperature sensor 41 is at the same temperature as the thermocouple cold junction such that the sensor output is truly indicative of the cold junction temperature. FIGS. 4 and 5 show a detailed description of the bandgap device 41 and the copper bodies 23 and 25. The purpose of this structure is to assure that the bandgap device 41 produces a signal voltage that is truly representative of the temperature of the cold junction. This is accomplished by locating the bandgap device and the cold junction of the thermocouple within a common structure that serves to equalize the thermal response of the cold junction and the bandgap device to temperature changes. Thus, copper body 23 may be in the form of a slug having a central aperture 65. It is stacked above another copper slug 25 having a central aperture 68 and is separated from slug 25 by a thin layer of a quantity of thermally conductive but electrically insulating material 66 such as silicon grease. The layer 66 of silicon grease extends from the ID of the respective slugs 23 and 25 radially outwardly for a short distance to a point where it is surrounded and contained by an encircling body 67 of an epoxy potting compound. The bandgap temperature sensor device 41 is disposed with a snug fit within the cavity formed by apertures 65 and 68 in slugs 23 and 25 at the direct center of the composite assembly. A quantity of heat transmitting silicon grease 69 is disposed about the device 41 and contained by a sealing quantity of epoxy potting material 70 at the top and 71 at the bottom. In a working embodiment, the bodies 23 and 25 are each about 0.250" high with an outside diameter of about 0.5" and with a separation between bodies 23 and 25 of about 1 to 2 mils. The apertures 65 and 68 have a diameter of about 0.2".

As seen in FIG. 5, the copper leads 26 and 31 have their respective ends 72 and 172 secured by solder 73 and 74 within respective bores 75 and 76 passing radially part way through the respective slugs 25 and 23. The chromel and constantan wires 20 and 21 are connected, respectively, to the bodies 23 and 25 in a slightly different manner. The ends of the wires 20 and 21 at 77 and 78 have been stripped of insulation and inserted in the reduced diameter bores 79 and 80 so as to be in contact with both the bandgap device 41 and the respective copper bodies 23 and 25. The ends of the wires are held in place by solder 22 and 24, as shown. The insulation on the respective wires enters the enlarged diameter bore sections 81 and 82 with and is encased in solder as shown. Thus, the cold junction of the thermocouple is actually embedded within the copper bodies 23 and 25 in direct physical and thermal contact with the envelope of the bandgap temperature sensor 41. By proper dimensioning of the bodies 23 and 25 they function as thermionic inertia elements to equalize the thermal response rates of the cold junction of the thermocouple and of the bandgap temperature sensor 41.

Also as shown in FIG. 5 the chromel and constantan wires 20 and 21 connect, respectively, to the outer contact or shell 83 and to the coaxial inner contact 84 of a connector 85 for receiving the end 16 of the thermocouple probe 10 illustrated in FIGS. 1 and 2. It should be understood that the probe 10 telescopes over the contact 84 within the cylindrical outer contact 83 such that the thermocouple wire ends 17 and 18 make electrical contact with, respectively, contacts 83 and 84. The outer contact element 83 should be fabricated of chromel while the inner contact 84 should be of constantan so as to avoid contact potentials that would introduce an unwanted cold junction into the circuit. While not shown it is preferred to provide connector 85 with an insulating handle and to enclose wires 20 and 21 within a coiled elastically extendable sheath.

It is important to observe that the thermal inertia introduced by the copper bodies 23 and 25 insures that the temperature measured by the bandgap temperature sensor 41 is the same as that affecting the cold junction of the thermocouple. By using a commom voltage reference for the operational amplifiers and the analog-to-digital converter, any fluctuation in voltage as a result of temperature changes will be automatically compensated. However, the bandgap device 35 is extremely constant in its operation and substantially independent of temperature. Bandgap device 41 is similar to bandgap device 35 but with slightly different biasing it provides an accurate output voltage which is a function of the ambient temperature. With the circuit shown, temperature indications are obtained with reasonable accuracy from 0° F. to 400° F. and with an accuracy within ±0.2° F. over a range from 80° F. to 140° F.

The potentiometer 44 is used to adjust the output at junction 43 to the desired correspondence to ambient temperature. In the example just described it would be adjusted so that the output at junction 43 varies at the rate of 5.4248 mV./° F.

Another way of viewing the operation of the circuit of FIG. 3 is that the thermocouple produces a first signal which is a function of the difference between the temperatures at the hot and cold junctions. Bandgap temperature sensor 41 provides a second signal as a function of the temperature of the thermocouple cold junction. The CAZ amplifier 28 modifies the first signal, provided thereto by the leads 26 and 31 from the thermocouple, to change its voltage-to-degree relationship and combines therewith an offset voltage. The operational amplifier 50 is coupled to the bandgap device 41 and the CAZ amplifier 28 to provide a third signal representative of the algebraic addition of the first and second signals as modified. Finally, the analog-to-digital converter, 59, and display, 62, provide an output indicative of the temperature to be measured.

Figure 6:
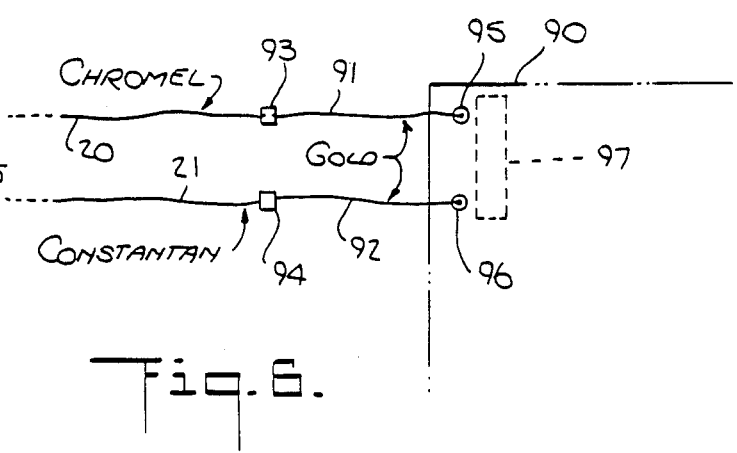
FIG. 6 is a diagrammatic view of an integrated circuit embodiment of the invention.

It is of particular significance that the principles underlying the circuit of FIG. 3 can be adapted to the production of an integrated circuit version. Referring to FIG. 6, the essential details are shown somewhat schematically. One corner of an IC chip 90 is shown provided with two gold lead connections 91 and 92 from conventional connecting pins 93 and 94. The chromel and constantan leads 20 and 21 from the probe connector 85 shown in FIG. 5 are connected as shown in FIG. 6 to the pins 93 and 94, respectively. Since gold when connected to either chromel or constantan produces junctions of relatively low contact potential the principle cold junction for the thermocouple assembly will be located where the gold leads 91 and 92 make contact with the aluminum bonding points 95 and 96 on the chip proper. If the bandgap device, since it is semiconductor based, is formed directly in the chip in close proximity to the entry points 95 and 96 such as shown by the phantom lines 97 there will be essentially no thermal gradient between the temperature at junctions 95 and 96 and at the location of the bandgap circuit component 97. Thus, the component 97, if connected in a circuit similar to that shown in FIG. 3, will provide a signal representative of the temperature of the cold junction of the thermocouple. Here, rather than using a relatively large mass as shown in FIGS. 4 and 5, which tends to slow down temperature changes at the cold junction so that the bandgap sensor will be at the same temperature as the cold junction, the same desired result is accomplished by using a structure of relatively little mass and by having the cold junction and semiconductor sensor so close together that, for all practical purposes, there can be no significant temperature gradient between the cold junction and the bandgap sensor.

The difference between a bandgap temperature sensor and a bandgap voltage reference resides in the manner in which the connections are made thereto. Consequently, it is also possible to combine the separate discrete assemblies shown in FIG. 3 into a unitary assembly with different outputs depending upon whether a temperature responsive sensor or voltage reference is desired. This is contemplated in the integrated circuit shown in FIG. 6. It may be assumed that in all other respects the circuit incorporated in the integrated circuit of FIG. 6 is the same as that shown in discrete form in FIG. 3. However, IC technology permits all of the structure incorporated in the chip, i.e., bonding points 95 and 96 and associated circuitry including bandgap device 97, to occupy an area approximately 1/16" in diameter. Consequently, it can be assumed that there is no temperature difference between any of the parts. Therefore, an important advantage of the integrated circuit embodiment is that it is not necessary to provide thermal masses such as the copper bodies 23 and 25 used in FIG. 3.

Where bandgap devices are mentioned throughout the specification it is to be understood that in order to obtain a reference voltage of 2.490 V. it is presently preferred to employ a device selected from the silicon family of semiconductors. Other semiconductor materials can be used to obtain different voltage levels and different temperature sensor characteristics if desired.

Little mention has been made of the display. Nevertheless, it should be understood that the temperature indicative signal furnished to the analog-to-digital converter can be used in various ways. The display can be interrupted and fixed after any desired time interval or it can be fixed after the rate of change of the temperature indicating signal has decreased below a preset level. Since the present apparatus is capable of producing a valid reading within about 3 seconds, a 5 second reading interval can be used with an adequate margin for reliability. Alternatively, the display can be permitted to operate continually with the operator noting the indication whenever it holds a reading long enough to permit reading.

Although the specific example described above provides temperature readings in terms of the Fahrenheit scale, it should be apparent that the system can be adapted to provide readings based on the Centigrade scale or in terms of any other desired scale. The various amplifier and digital components of the circuit of FIG. 3 can be altered as will appear to those skilled in the art.

Having described the presently preferred embodiments of the subject invention it should be understood that various changes in details of construction can be incorporated without departing from the true spirit of the invention as defined in the appended claims.

What is claimed is:

1. A temperature measuring device for providing a signal representative of a temperature to be measured, comprising in combination a thermocouple for sensing the temperature to be measured, said thermocouple having a hot and cold junction for providing a first signal as a function of the temperature difference between said hot and cold junctions, means comprising a semiconductor thermal sensitive component arranged in a common structure with said cold junction to provide a second signal as a function of the actual temperature of said cold junction and based upon the absolute scale of temperature, and means coupled responsively to said first mentioned means and thermocouple for providing a third signal representative of the algebraic addition of said first and second signals, said third signal being representative of said temperature to be measured, said cold junction and said semiconductor component being coupled to a thermionic inertia element for equalizing the thermal response rates of said thermocouple cold junction and said semiconductor component, said thermionic inertia element comprising two bodies of the same conductive metal disposed side by side separated by a thin layer of electrically insulating but thermally conductive material, said bodies being of different metal from that of said thermocouple hot junction and connected to said thermocouple hot junction to provide said cold junction, said bodies defining an internal cavity, and said semiconductor component is mounted within said cavity.

2. A temperature measuring device according to claim 1, wherein said semiconductor component is selected from the silicon family of semiconductors.

* * * * *